Feb. 14, 1933.   C. P. DUBBS   1,897,576
PROCESS FOR CONVERTING HYDROCARBON OILS
Original Filed June 1, 1925
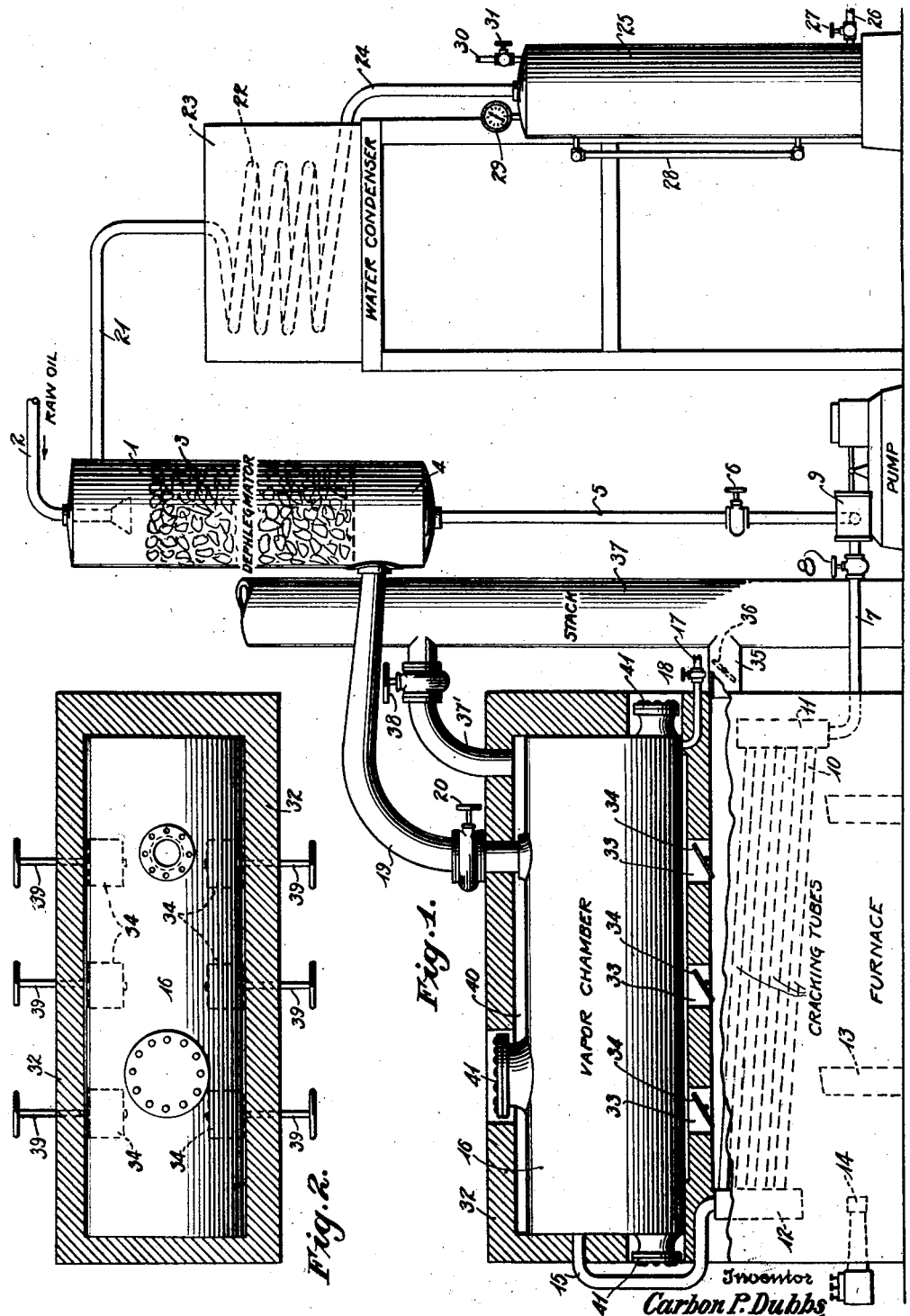

Patented Feb. 14, 1933

1,897,576

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS FOR CONVERTING HYDROCARBON OILS

Application filed June 1, 1925, Serial No. 34,131. Renewed June 12, 1929.

This invention relates to a process for converting heavy hydrocarbons into lighter or lower boiling point hydrocarbons and refers more particularly to a continuous process in which no liquid residual oil is formed during the operation of the process. This application is a continuation in part of my application Serial No. 403,078, filed August 12, 1920.

One of the salient objects of the invention is to provide a process by which a maximum amount of pressure distillate can be obtained from the charging oil. This is accomplished by separating the oil into low boiling point distillate and a comparatively dry solid substance which collects in the reaction chamber of the apparatus.

It is also an object of the invention to provide a process which is continuous and in which the temperature of the reaction or vapor chamber can be accurately controlled to bring about the desired separation of the oil into distillate and a comparatively dry solid substance.

For clearness, my improved process will be described in connection with the apparatus disclosed in the accompanying drawing, in which:

Figure 1 is a diagrammatic side elevation of the apparatus with parts shown in section.

Fig. 2 is a plan view of the vapor or the reacting chamber.

Referring in detail to the drawing, the charging oil is introduced into the top of the dephlegmator 1, through the inlet pipe 2 and is sprayed upon the comminuted material such as broken rock, small pieces of iron, porcelain or other material, which serves to finely divide the incoming charging oil so that the oil vapors rising through the dephlegmator will be exposed to a greater dephlegmating surface. The charging oil and the reflux condensate separated from the vapors in the dephlegmator collect in a pool in the bottom of the dephlegmator indicated at 4. This mixed charging oil and reflux condensate is drawn off from the bottom of the dephlegmator through the line 5 controlled by the valve 6. The line 5 communicates with the pump 9 by which the charging oil and reflux condensate is forced through the inlet pipe 7 controlled by a valve 8 to the cracking tubes 10. These tubes are mounted between headers 11 and 12 and are positioned in the furnace 13 which is heated by means of gas burners 14. The oil after being raised to a cracking temperature in the tubes is directed from the header 12 through the transfer line 15 into the vapor or reaction chamber 16, where further reaction takes place, resulting in the release of the oil vapors and a simultaneous deposition of the carbon and pitch-like substance in the chamber. This relatively solid substance is permitted to accumulate in the bottom of the chamber.

The pressure distillation is continued until this heavy pitchy substance is reduced to practically a dry state. During the operation of the process the oil is fed slowly through the cracking tubes and at no time is there any considerable collection of liquid oil in the vapor or reaction chamber. For permitting use of the apparatus in a residuum run and for permitting withdrawal of residual oil at the begining of the operation of the process, a draw-off line 17 controlled by a valve 18 is tapped into the bottom of the vapor or reaction chamber 16.

The vapors evolved from the oil in the chamber 16 rise through the goose-neck 19 regulated by the valve 20 and are dephlegmated, as previously described. The uncondensed vapors passing out of the top of the dephlegmator are conveyed through the line 21 to the coil 22 positioned in the water condenser box 23. The resulting liquid condensate passes from the water condenser through the line 24 and is collected in the receiver 25 from where it may be withdrawn from time to time through the draw-off line 26 regulated by valve 27. The receiver 25 is of conventional form being provided with a liquid level gauge 28, pressure gauge 29 and gas outlet pipe 30 controlled by valve 31 through the medium of which the pressure is controlled.

It is to be noted that the reaction chamber 16 is mounted within insulated walls 32 directly above the main portion of the furnace and that there are communicating ducts 33 which connect the furnace directly with the space surrounding the chamber. These ducts are provided with suitable dampers 34 which are arranged to provide a means for accurately regulating the amount of heating gases permitted to pass from the furnace into the space surrounding the reaction chamber. The heating gases, which are normally passed through the opening 35 regulated by the damper 36 directly to the stack 37, can be diverted through the ducts 33 and caused to pass around the reaction chamber, where they assist in further distillation of the oil constituents in the reaction chamber by permitting an accurate control of the temperature therein. The heating gases after passing around the reaction chamber are directed to the stack 37 through the connecting flue 37' which is controlled by a suitable damper valve 38.

The hand wheels 39, shown in Fig. 2, furnish a means for regulating the dampers 34, whereby the amount of heating gases permitted to circulate about the reaction chamber can be definitely controlled. At the beginning of the run, an increased amount of the heating gases will be required to be diverted to the space around the reaction chamber in order to raise the oil constituents in that chamber to the desired temperature. By suitably controlling the temperature of the reaction chamber substantially all of the liquid constituents of the oil will vaporize and pass out of the chamber through the vapor line and only the precipitated carbon and very heavy pitch-like sludge will collect in the bottom of the reaction chamber. As this substantially solid substance collects in the bottom of the chamber, it will take up more and more space until it has accumulated to such a degree as will necessitate the shutting down of the process and the cleaning of the reaction chamber. Plates 41 are provided for permitting access to the chamber when it is to be cleaned.

A novel feature of this invention is the fact that at no time is there permitted to accumulate any substantial quantity of liquid in the reaction chamber. The condensate which is formed in the dephlegmator is collected and returned with the charging oil to be re-treated in the cracking tubes. By properly controlling the temperature of the reaction chamber it is possible to reduce the entire body of the oil to a liquid distillate which is collected in the receiver and a comparatively dry solid substance which is collected in the reaction chamber. There is no large body of oil collected in any one place in the applicant's process and the charging material is substantially separated into two substances,—distillate and a substantially solid residue.

The following illustrative run may be given: Subjecting mid-continent gas oil approximately 33° Baumé gravity to a temperature of from 830° to 880° F., in reducing the same by substantially complete distillation 5 to 10% of coke is formed, 3 to 8% uncondensable gas, and from 82 to 92% liquid pressure distillate having a Baumé gravity ranging from 46° to 50°.

What I claim as my invention is:

1. A continuous process for converting hydrocarbon oils, consisting in heating the oil to a cracking temperature while flowing in a restricted stream through a heating zone, in transferring the heated oil from said stream to an enlarged reaction chamber, in so controlling the quantity and character of the oil flowing through the heating zone and the temperature of the oil in the reaction chamber that the oil constituents separate in said chamber into vapors and a practically dry residue, in effecting the control of the temperature of the oil in said reaction chamber by circulating controlled quantities of combustion gases from said heating zone about said reaction chamber, in subjecting the vapors issuing from said reaction chamber to dephlegmation, in condensing the dephlegmated vapors, in collecting the resulting distillate, in continuously passing reflux condensate resulting from the dephlegmation of the vapors to said heating zone, and in maintaining a self-generated superatmospheric pressure on the oil undergoing treatment in the process.

2. A process for converting hydrocarbon oils, consisting in heating the oil to a cracking temperature in a heating zone, conducting the cracked oil to an enlarged vapor chamber located outside of the heating zone, distilling the cracked oil to a practically dry residue in said vapor chamber, dephlegmating and condensing the condensible oil vapors released in said vapor chamber, controlling the temperature at which the reaction takes place in the vapor chamber by directing around said vapor chamber a regulated portion of the heating gases from said heating zone, and maintaining a regulated superatmospheric pressure of the generated vapors upon the system during distillation.

3. The process of cracking hydrocarbon oils comprising feeding oils slowly through a heating zone, in conducting the oil to a vapor chamber disposed outside of said heating zone, in maintaining only small quantities of the oil in the vapor chamber to cause a complete distillation of the liquid content of the oil leaving a substantially solid residue, in regulating the temperature of the vapor chamber by controlling the passage of heating gases from said heating zone therearound, in discharging vapors from the vapor chamber, and in maintaining a superatmospheric vapor pressure on the oil undergoing distillation.

CARBON P. DUBBS.